Aug. 9, 1932.　　　J. FREUD ET AL　　　1,870,246
MOTOR OPERATED MECHANISM
Filed Oct. 26, 1928　　5 Sheets-Sheet 1

Inventors:
Joseph Freud &
Charles H. Koehler
By Fred Gerlach
Their Atty.

Aug. 9, 1932.  J. FREUD ET AL  1,870,246
MOTOR OPERATED MECHANISM
Filed Oct. 26, 1928   5 Sheets-Sheet 2
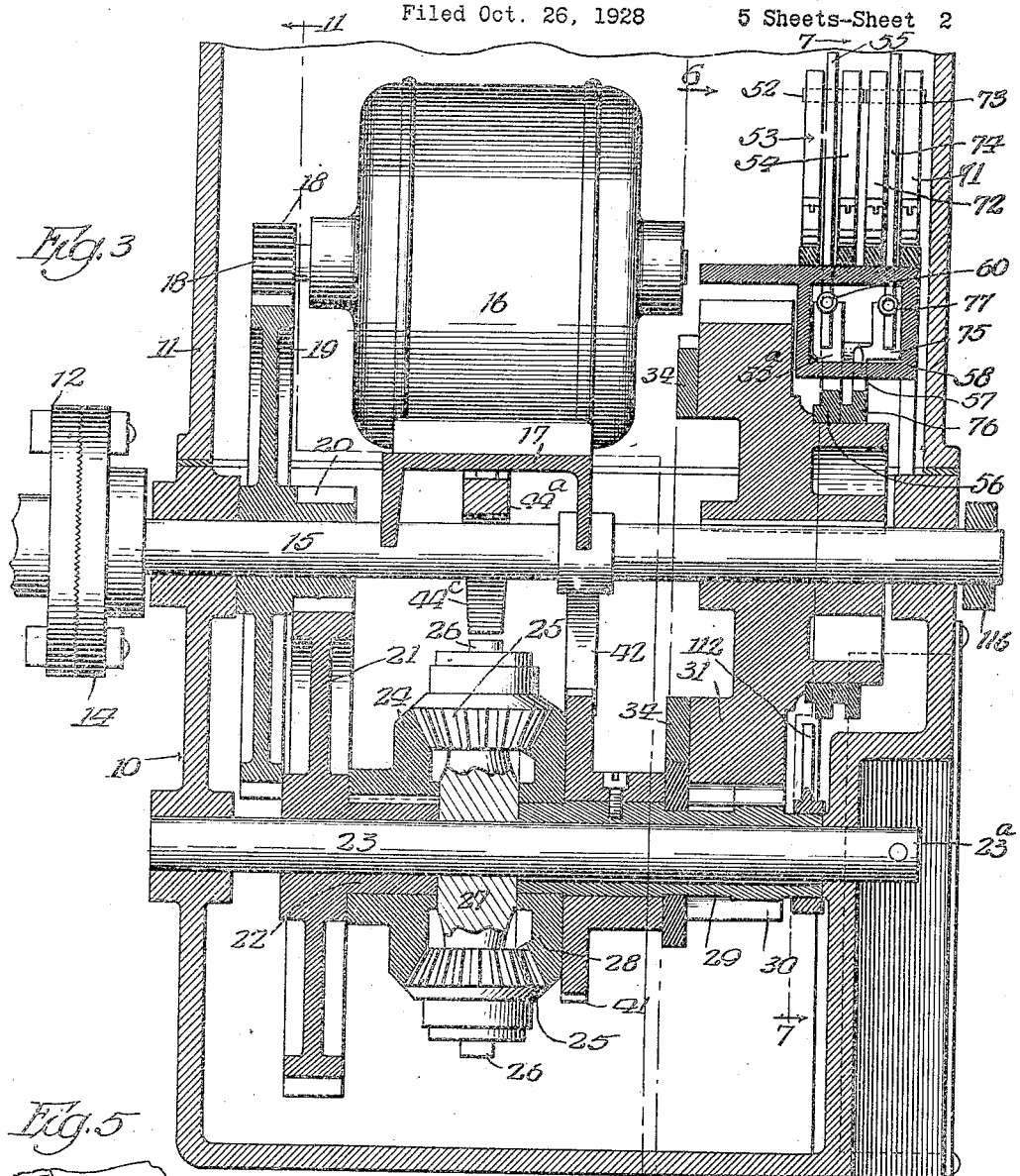
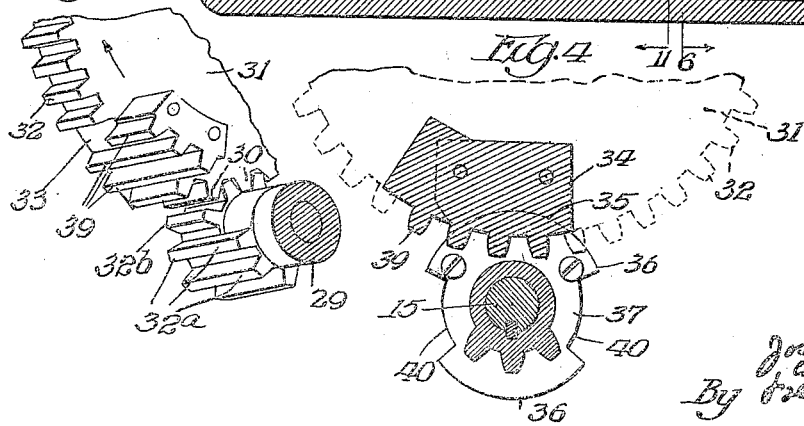

Aug. 9, 1932.    J. FREUD ET AL    1,870,246
MOTOR OPERATED MECHANISM
Filed Oct. 26, 1928    5 Sheets-Sheet 3

Aug. 9, 1932.  J. FREUD ET AL  1,870,246
MOTOR OPERATED MECHANISM
Filed Oct. 26, 1928   5 Sheets-Sheet 4

Aug. 9, 1932.  J. FREUD ET AL  1,870,246
MOTOR OPERATED MECHANISM
Filed Oct. 26, 1928   5 Sheets-Sheet 5

Inventors
Joseph Freud &
Charles H. Koehler
By Fred Gerlach
Their Atty.

Patented Aug. 9, 1932

1,870,246

UNITED STATES PATENT OFFICE

JOSEPH FREUD AND CHARLES H. KOEHLER, OF CHICAGO, ILLINOIS

MOTOR OPERATED MECHANISM

Application filed October 26, 1928. Serial No. 315,148.

The invention relates to motor-operated mechanism for operating devices, such, for example, as disconnect switches for high tension lines.

One object of the invention is to provide improved motor-operated gearing for operating an element in predetermined cycles, which will operate freely during an initial cycle to give the electric motor an opportunity to pick up its speed before the load of the switch-operating mechanism is imposed thereon.

Another object of the invention is to provide mechanism of this type in which positively acting stop-mechanism is utilized so that the use of an electric brake may be dispensed with.

Another object of the invention is to provide mechanism of this type, in which the gearing is initially operated without the load to lubricate the parts before the load is applied.

Another object of the invention is to provide mechanism of this character in which the stop-device is controlled by a magnet, and which is provided with means for removing any ice which may accumulate between the magnet and its armature.

Another object of the invention is to provide improved means for signalling the positions of the operating mechanism to a central controlling station.

Other objects of the invention will appear from the detailed description.

The invention consists in the several novel features hereinafter set forth and more particularly defined by claims at the conclusion hereof.

Figures 1, 2:
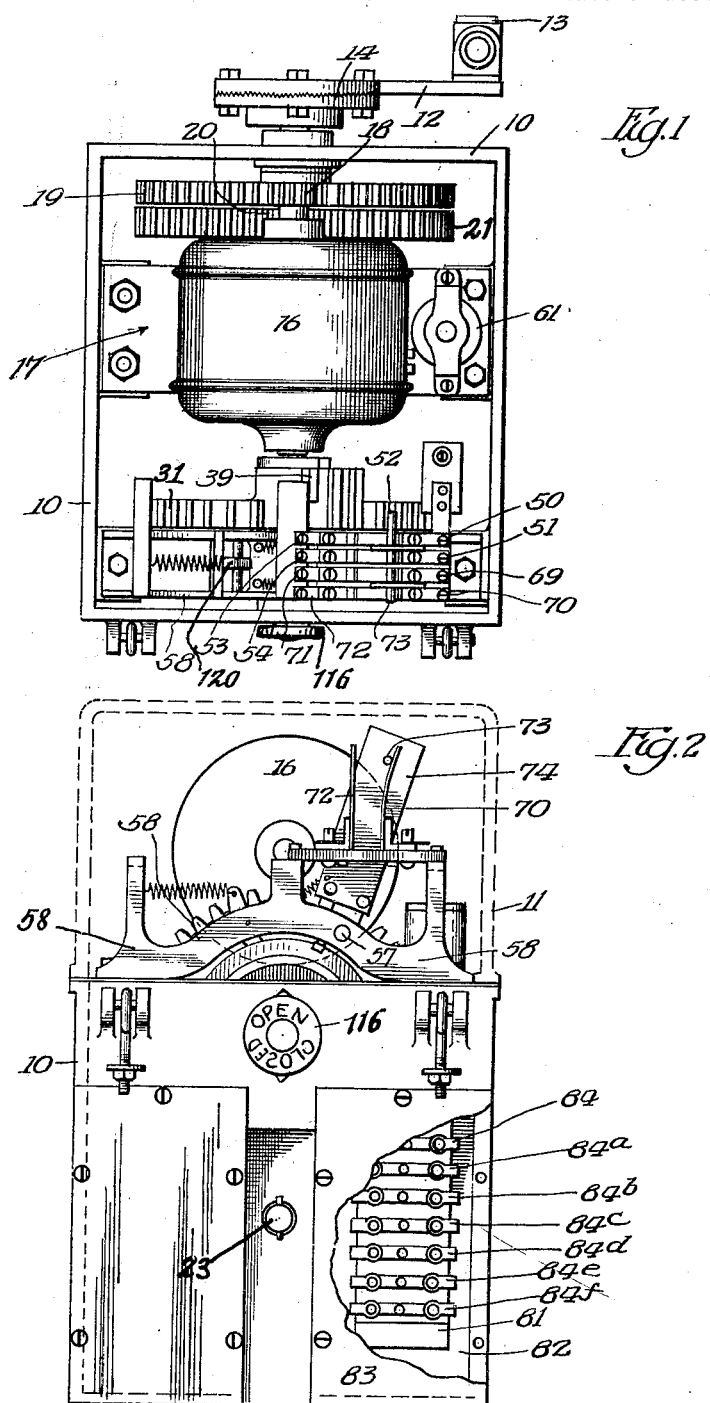
Figure 6:
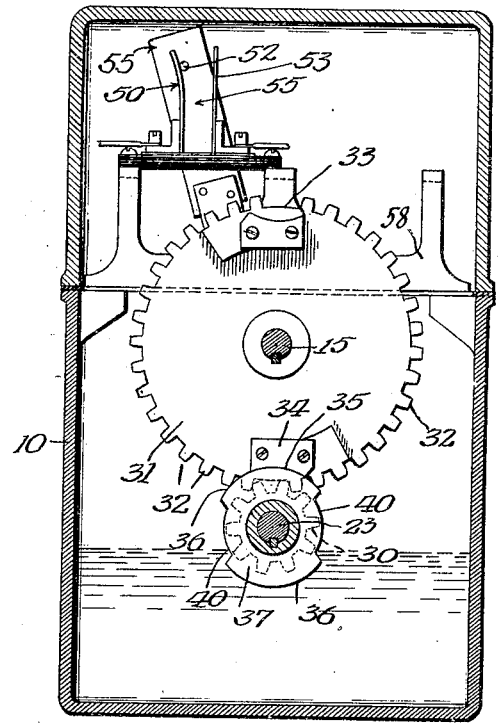
Figure 7:
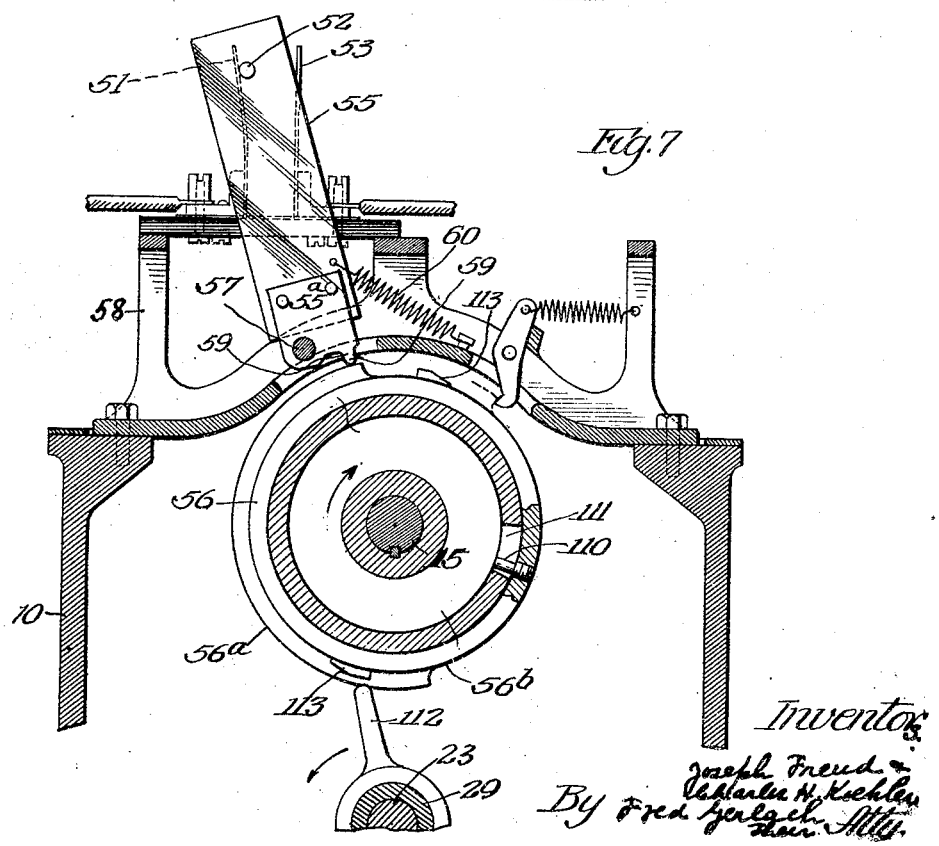
Figure 11:
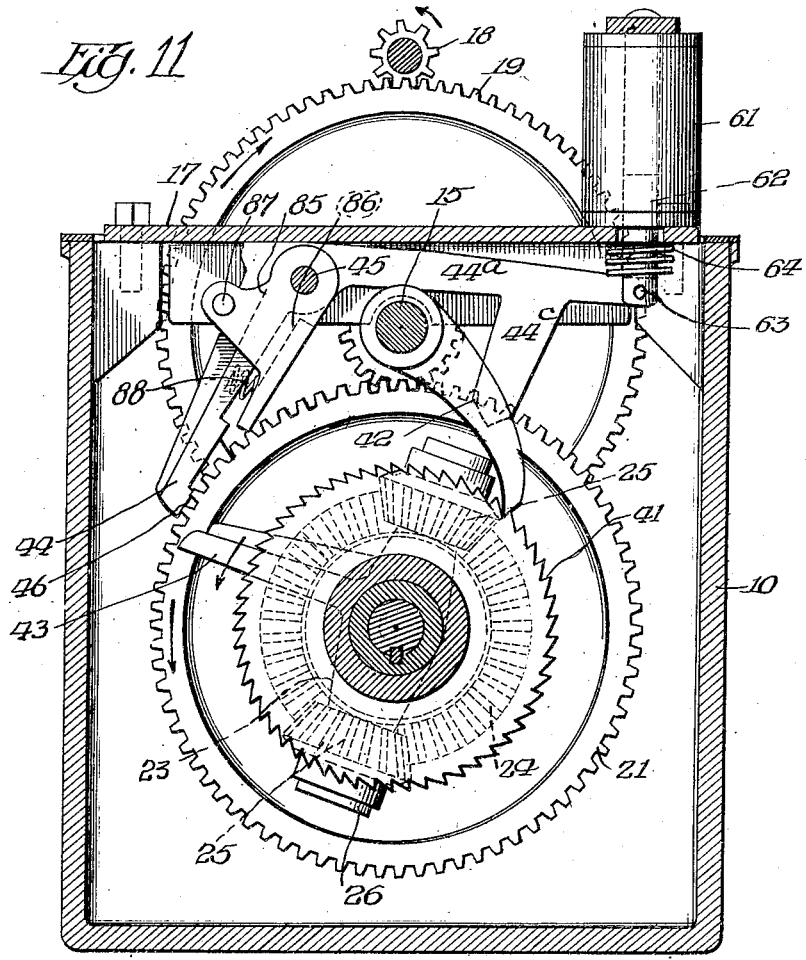
Figure 12:
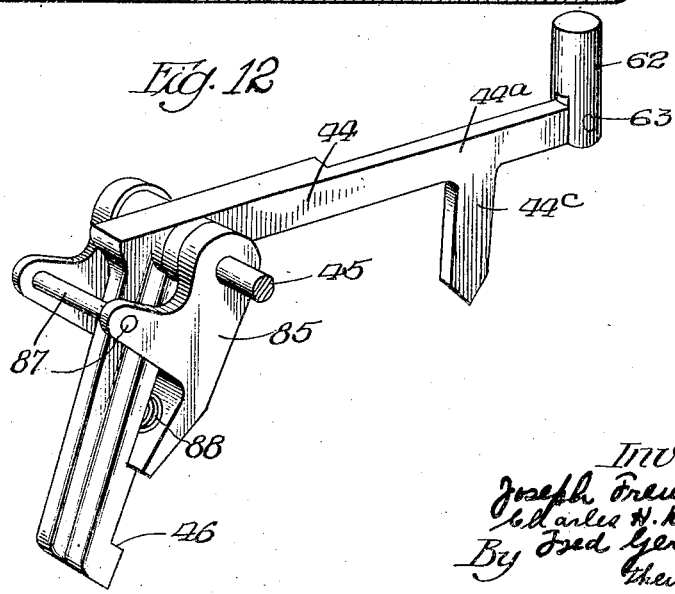

In the drawings: Fig. 1 is a plan of mechanism embodying the invention, the cover being removed for illustrative purposes. Fig. 2 is a front elevation. Fig. 3 is a longitudinal section. Figs. 4 and 5 are details of the skip-stop gears between the countershaft and the intermittently operated shaft. Fig. 6 is a section on line 6—6 of Fig. 3. Fig. 7 is a section on line 7—7 of Fig. 3, the motor-switch being shown in one of its alternative positions. Fig. 8 is a diagram of the electrical connections for the switch-operating mechanism. Fig. 9 is a section similar to Fig. 7, but showing the automatic switch for the motor in its other alternative position. Fig. 10 is a detail of the automatic switch for the signalling circuits. Fig. 11 is a section on line 11—11 of Fig. 3. Fig. 12 is a detail perspective of the stop-lever for the planetary pinion-carrier.

The invention is exemplified in mechanism, contained in a box 10, which is provided with a removable cover 11, to operate a crank 12 which has a wrist pin 13 which may be connected by a link or in any other suitable manner to the device to be operated, such, for example, as a switch for controlling a high tension line, as well understood in the art. Crank 12 is adjustably secured to a hub 14 which is fixed to a shaft 15 which is journalled in, and extends through, the box 10, said hub being secured to one end of said shaft outside of the back of the box. Shaft 15 is rotated in the same direction in successive duty cycles of one-half revolutions to operate the crank 12. These movements may be advantageously used to alternately open and close a switch for an electric circuit.

The mechanism for operating shaft 15 comprises an electric motor 16 which is mounted on a channel beam 17 which is secured to box 10; a pinion 18 secured to the shaft of the motor; a gear 19 which is journalled to revolve on shaft 15 and meshes with pinion 18; a pinion 20 integral with gear 19 and rotated thereby; a gear 21 meshing with and driven by pinion 20, and provided with a hub 22 which is journalled on a countershaft 23 which is parallel to the shaft 15, and which is journalled in the front and rear walls of box 10; a bevelled gear 24 keyed to rotate with hub 22 of gear 21; a pair of planetary bevelled pinions 25 which are journalled on the studs 26 of a planetary pinion-carrier 27 which is journalled on shaft 23; a beveled gear 28, meshing with planetary pinions 25, and fixed on a sleeve 29 which is keyed to the countershaft 23; a pinion 30 integral with sleeve 29; and a gear-wheel 31 which is adapted to be driven by pinion 30, and is keyed to, and adapted to drive the shaft 15. The teeth 32 of gear 31 (Figures 4 and 5) are omitted at diametrically opposite points, as at 33, so that the teeth of pinion 30 will discontinue the rotation of gear 31 at the end of cycles of one-half revolution each. Locking plates 34, fixed to gear 31 at diametrically opposite points, each having a curved peripheral recess 35, and a disk 37 which is keyed to rotate with sleeve 29, and has its periphery formed, as at 36, to enter said recesses, are adapted to lock gear 31 and shaft 15 at the end of each cycle. Three teeth 32$^a$ of pinion 30 are extended to one side, and are adapted to engage two coacting series of three teeth 39 at the inner side of gear 31 adjacent clearances 33 respectively, to start the rotation of gear 31 and move it sufficiently to bring the teeth of pinion 30 into mesh with the teeth 32 of gear 31 at the commencement of each cycle, and after the locking plates 34 have been released from disk 37. The disk 37 is provided with peripheral notches 40 to release and permit the disk to clear the locking plate 34 at the commencement of each cycle.

A ratchet-wheel 41 is fixed to sleeve 29 which is rigid with pinion 30, and a dog 42, pivoted to shaft 15, engages said wheel to prevent reverse movement of pinion 30 and shaft 23. A stop-arm 43 is formed on the planetary pinion-carrier 27, and is controlled or arrested by a magnetically controlled lever 44. Said lever 44 is pivoted on a pin 45 which is mounted in the channel 17, and has a latch arm with a tooth 46 which is adapted to be moved into and out of the path of rotation of arm 43 to control the operation of the planetary pinions. While latch 46 is outside of the path of arm 43, the planetary pinion-carrier 27 is free to rotate or idle, without operating gear 28, sleeve 29, and pinion 30 during these idling periods. When the tooth 46 of latch 44 is shifted into the path of stop-arm 43 it will secure the carrier 27 against rotation. When the carrier is thus held, studs 26 for the planetary pinions 25 will be stationary, and pinions 25 will be rotated around said studs by gear 24, and said pinions will drive gear 28, sleeve 29 and pinion 30 to operate gear 31 and shaft 15 one cycle. At the end of each cycle, the latch 44 will release stop arm 43 to discontinue the rotation of sleeve 29. Upon such release, the momentum of gears 21 and 24 will move stop-arm 43 a short distance, so that lever 44 will not arrest the carrier until the latter makes another revolution. A dog 85 is pivoted on pin 45, and is adapted to prevent back-lash of stop-arm 43 when the driven mechanism runs faster than the driving mechanism. This dog is pressed into operative position by a spring 88, and its throw is confined by a pin 87 and abutment 86.

A magnet for controlling lever 44 comprises a helix 61 and a solenoid armature 62 which has its lower end pivoted at 63 to an arm 44$^a$ of said lever. A spring 64 normally and yieldingly holds the lever 44 in its released position, and retracts the armature when the helix is deenergized. The helix 61 is included in a conductor 65 which is connected to the motor circuit so that while the motor is in operation the magnet will be energized to hold the lever 44 in the path of the arm 43 on the planetary pinion carrier 27. The motor 16 is of the compound type, and is included in a conductor 66 between switch-member 50 and a termined block 67.

In practice the motor-operated mechanism may be located where it is exposed to the elements, so that ice, resulting from condensation and freezing weather, will accumulate around the magnet, which will prevent the operation of the electro-magnet for operating the lever 44. To prevent this, an arm 44$^c$ is formed on the arm 44$^a$ of lever 44. The lower end of said arm is in the path of movement of the arm 43 of the planetary pinion-carrier 27, so that during the idling period or first revolution of each operation, arm 43 will impart a stroke to lever 44 and lift armature 62 to break any accumulation of ice that may be present, so the armature will be free to be operated responsively to the energizing of the helix 61.

The operation of the gearing thus far described will be as follows: normally the latch-tooth 46 of magnetically controlled lever 44 will be withdrawn from the path of stop-arm 43. When the circuit for the motor 16 is closed, pinion 18 will drive gear 10, pinion 20, gear 21, and gear 24, and so long as the carrier 27 is free, pinions 25 will rotate bodily and idle, the gear 28 remaining stationary during this period. This occurs as a preliminary step to each operating cycle of the shaft 15 and gear 31. As a result, the motor 16 will be free to operate, for a sufficient period to permit it to acquire the normal speed desired, before the operating load is placed upon it. The box 10 contains lubricant for the gearing, and during this idling period, the planetary pinions and gear 21 will revolve in the oil to splash it over the gearing in the box, to cause it to be lubricated preliminarily to each operating cycle of the shaft 15. During this idle revolution, arm 43 will strike arm 44$^c$ of lever 44, to release armature 62, if it should be stuck or frozen to the helix 61. When the motor is started, lever 44 will be shifted by the magnet into the path of rotation of arm 43, but the latter will be free to complete approximately one revolution before it is caught by said lever, and during this revolution, the motor will acquire the desired speed, and the gearing will be lubricated. When lever 44 arrests arm 43, the planetary pinion-carrier 27 will remain stationary, and pinions 25 will rotate gear 28 and sleeve 29, to operate the shaft 15 one cycle or one-half revolution. Initially, disk 37 will rotate independently of gear 31, and when plate 34 has been unlocked and is free to enter one of the recesses 40, teeth 32ᵃ on pinion 30 will engage teeth 39 at one side of gear 31 and rotate said gear a sufficient distance to bring pinion-teeth 32 into engagement with the teeth 32ᵇ of gear 31. Thereupon, gear 31 and shaft 15 will be rotated until the teeth 32ᵇ of pinion 30 enter the gap 33 on the opposite side of gear 31. Then, the disk 36 will interfit with the adjacent locking-plate 34 and positively lock gear 31, shaft 15, and the switch-operating crank 12 in one of its predetermined positions, and at the end of a cycle of one-half revolution. At this time the lever 44 is automatically operated to release stop arm 43, as hereinafter set forth. This operation will be repeated for each half revolutionary cycle of shaft 15, so that during alternating cycles, crank 12 will be operated to operate a device, such as a disconnect switch. Shaft 23 is extended to the outside of the case, as at 23ᵃ, so that a crank for manually operating the shifting mechanism may be applied to the shaft to operate the gearing. An indicating disk 116 is fixed to the front end of shaft 15, and marked to indicate the position of the switch or device operated by the motor-operated mechanism.

A switch is provided to automatically interrupt the circuit for the operation of motor 16 at the conclusion of each duty cycle. This switch comprises a pair of contacts 50 and 51 for a circuit to operate the motor during the switch-closing cycle of shaft 15 (Figs. 6, 8, and 9), a pair of contacts 53 and 54 for establishing a circuit to operate the motor during the switch-opening cycle of crank 12, a bridge-pin 52, adapted to carry current between said pairs of contacts respectively, and arm 55 which carries said pin, and a cam-ring 56 connected by a stud 110 and a slot 111 to the hub of gear 31. Said ring controls the movements of switch-arm 55. Arm 55 is formed of insulating material secured to a hub 55ᵃ which is pivoted on a pin 57 mounted in a frame 58 which is secured to the box 10. A tooth or abutment 59 on hub 55ᵃ is adapted to ride on the periphery of the cam-ring 56. A spring 60 is applied to hold arm 55 normally in position to close the circuit for the operation of the motor during the switch-opening cycle. Cam 58 has its periphery formed with a raised portion 56ᵃ to hold the switch-arm 55 into position to close the motor-circuit for the switch-closing cycle, and a depressed portion 56ᵇ which releases said switch-arm so it will be held by spring 60 in position to close the motor-circuit for the switch opening cycle of shaft 15.

To insure full movement of cam ring 56 to accurately control the operation of motor 16, a kick-arm 112 is keyed to rotate with pinion 30. Stud 110 and slot 111 constitute a lost-motion connection between gear 31 and said ring which permits said arm to impart the final movements to the ring at the end of each cycle. Abutments 113, at diametrically opposite points on ring 56, are timed, so that as the gear approaches the end of each cycle, arm 112 will engage one of these abutments and impart the final movement to the ring. The drag of the switch-arm 55 will, during the succeeding cycle, retard the rotation of the ring until the stud reaches one end of slot 111, so that during the succeeding cycle, stud 110 will be positioned in slot 111, so that the kick-arm 112 can impart the final rotative movements to the ring 56. To insure the retardation of ring 56, a spring-pressed dog 120 may be used to engage the front end of raised portion 56ᵃ of said ring. The movements of switch-arm 55 occur during these final movements.

Switch-mechanism is also provided to control the signalling circuits for indicating the positions of the device to be operated by the motor-operated mechanism. This switch-mechanism comprises a pair of contacts 69 and 70, an oppositely arranged pair of contacts 71 and 72, a bridge-pin 73, arm 74 of insulating material in which said pin is secured, a hub 75 to which the arm is secured, and which is pivoted on pin 57, and a cam ring 76 which is adapted to engage a tooth 77 on hub 75 of arm 74, and a ring 76 which is secured to rotate with gear 31, and is provided with a raised portion 76ᵃ to operate the arm 74 to close the circuit through contacts 69 and 70 and bridge-pin 73 for a circuit to actuate a green signal lamp 78 generally located at the control board of a station to indicate the full open position of the motor-operated mechanism. This ring 76 is also provided with a notch 76ᵇ diametrically opposite the raised portion 76ᵃ which releases the tongue 77 of switch-arm 74 so it will close a circuit through bridge-pin 73 and contacts 71 and 72 to light a red signal lamp 79, to indicate the full closed position of the motor-operated mechanism. Between raised portion 76 and notch 76ᵇ, the periphery of ring 76 is formed to hold switch-arm 74 in a centralized position during which the signal circuits will be open. A switch 80 is provided usually at the control board of the central station to control the operation of the motor-operated mechanism. A terminal block 81 of insulating material is located in a recess 82 at one side of the box 10. This recess is normally closed by a removable plate 83. The circuit connections include terminal plates 84, 84ᵃ, 84ᵇ, 84ᶜ, 84ᵈ, 84ᵉ and 84ᶠ which are mounted on this block.

The operation of the controlling mechanism will be as follows: Assuming the high-tension switch, operated by crank 12, to be open, and it is desired to close it, the operator at the control-board will shift the switch 80 to engage a contact 80ᵇ. The following circuit through the green lamp 78, indicating to the operator at the control-board that the high tension switch is open, is always established; viz. line conductor 90, conductor 96, conductor 99, in which said lamp is included, terminal plate 84ᵈ, conductor 100, contact 70, bridge-pin 73, contact 69, conductor 101, terminal plate 84ᵉ, conductor 102, and line conductor 94. The closing of the switch 80 at contact 80ᵃ will establish a circuit for the operation of motor 18 as follows: line conductor 90, switch 80, contact 80ᵇ, conductor 104, terminal plate 84, conductor 105, contact 51, bridge-pin 52, contact 50, conductor 66, in which the motor and terminal plate 67 are included, conductor terminal plate 84ᶠ, and line conductor 94. Simultaneously, current will pass between contact 50 and plate 67 through conductor 65 in which the helix 61 is included. This circuit will simultaneously start the motor 16 and energize the helix 61 to operate armature 62 to rock lever 44. Normally, the arm 43 and lever 44 are in the position illustrated in Fig. 11 of the drawings, so that during the initial operation of the motor 16, pinion 18, gear 19, pinion 20, and gears 21 and 24 will rotate the pinion-carrier 27. Gear 28 being locked, planetary movement will be imparted to pinions 25 until the arm 43 has completed approximately one revolution and is arrested by the stop 46 of lever 44. During this intial operation, the planetary pinions and gear 21 will splash the lubricant in the box 10 to lubricate the gearing preparatory to picking up the load of the device operated by crank 12, and the motor 16 will have time to acquire its full speed before the load is imposed upon it. Next, when stop-arm 43 is arrested by lever 44 at the end of the first revolution, planetary pinions 25 will be held against bodily movement and gear 28, pinion 30, and disk 37 will be rotated thereby as the motor 16 continues to operate. Disk 36 will first release locking plate 34, and teeth 32ᵃ will engage teeth 39 of gear 31 a sufficient distance to start gear 31, to bring pinion-teeth 32ᵃ into mesh with teeth 32 of gear 31, whereupon gear 31 will be rotated until it has completed a cycle of one-half revolution. The switch-controlling cam rings 56 and 76 will also be rotated. During this cycle, switch-arm 55 will be held by cam-portion 56ᵃ of ring 56 in position to keep the motor circuit closed through contacts 50 and 51 until the end of the cycle, and ring 76 will hold switch-arm 74 in its neutral position to discontinue the signals at the control-board, between the commencement and the end of said cycle. When a gap 33 in the teeth of gear 31 reaches the teeth 32 of pinion 30, wheel 31 will stop and disk 36 will lock the then adjacent plate 34 in correct position at the end of the cycle. After gear 31 stops at the end of this cycle, kick-arm 112 will strike one of the lugs 113 on ring 56, and shift the latter into position for controlling the motor 16 for the next cycle. Depressed portion 56ᵇ of cam ring 56, at the conclusion of this cycle, will permit spring 60 to retract switch-arm 55 and shift bridge-pin 52 across contacts 53 and 54, so that the circuit which has been closed at switch 80ᵇ through the motor 16 and magnet 61 will be opened. The motor will then stop, and magnet 61 will be deenergized. Simultaneously, recess 76ᵇ in cam ring 76 will permit spring 77ᵃ to operate switch-arm 74 into position to cause bridge-pin 73 to close a circuit across contacts 71 and 72 to actuate the red lamp 79 to indicate to the operator at the control board that the duty cycle of the motor-operated mechanism has been completed. This circuit will be as follows: line conductor 90, conductor 96, conductor 106 in which red lamp 79 is included, terminal plate 84ᵇ, conductor 97, contact 71, bridge-pin 73, contact 72, conductor 98, terminal plate 84ᶜ, conductor 98ᵃ, and line conductor 94. As soon as the red lamp 79 flashes, the operator at the control-board will know that the duty cycle has been completed or that the high tension switch has been closed by crank 12. At the end of each duty cycle, the momentum of the gears 19, 20, 21, will cause the switch arm 43 to move slightly beyond the stop tooth 46 of lever 44, so that when the circuit is closed for motor 16 and the magnet 61, 62 at the commencement of the succeeding cycle, lever 44 will not engage arm 43 until the latter has made approximately one revolution.

When the motor-operated mechanism is to operate crank 12 the next cycle to open the high tension switch the operator at the control-board will shift switch 80 into engagement with contact 80ᵃ, which will establish a circuit for motor 16 and helix 61, as follows: line-conductor 90, switch 80, contact 80ᵃ, conductor 91, terminal plate 84ᵃ, conductor 92, contact 54, bridge-pin 52, contact 53, conductor 93, conductor 66, in which the motor 16 is included, and conductor 65 in which helix 61 is included, terminal plate 84ᶠ, and line-conductor 94. This will cause the motor to operate the gearing the alternate cycle in the same manner as previously described. During this cycle, depressed portion 56ᵇ in ring 56 will permit spring 60 to hold arm 55 so pin 52 will bridge contacts 53 and 54. As gear 31 approaches the end of this cycle, kick-arm 112 will positively shift ring 56, so its raised portion 56ᵃ will ride under and shift arm 55, to interrupt said circuit for motor 16 and magnet 61, to stop the gearing at the end of this duty cycle. After starting, and during this cycle, cam-ring 76 will shift arm 74 into its neutral position to open the signalling circuits until the cycle has been completed, when the raised portion 76ª of cam ring 76 will operate switch-arm 74 into position to cause bridge-pin 73 to engage contacts 69 and 70 to close a circuit to actuate the green lamp 78 to indicate to the operator at the control-board that the duty cycle has been completed, and that the high tension switch has been shifted to its open position. This circuit will be as follows: conductor 96, conductor 99 in which lamp 78 is included, plate 84ᵈ, conductor 100, contact 70, pin 73, contact 69, conductor 101, plate 84ᵉ, and conductors 102, 94.

The invention exemplifies improved electric motor-operating spur-gearing for operating switches or other devices, in which the gearing is operated during a preliminary period before the load is imposed upon the electric motor for operating the switch; in which the gearing is operated idly to lubricate it before the full load is imposed on the motor; in which the gearing is normally free so that it may be operated manually whenever desired; in which magnetically controlled stop-mechanism arrests the gearing at the conclusion of each duty cycle and an electric brake is dispensed with; in which the positions of the high tension switch or other operated device are signalled to the operator at the control-board; and in which the gearing is operated in positive cycles of one-half revolution each.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. In motor-operated mechanism, the combination of a shifting element, an electric motor, gearing operated by the motor, intermittent mechanism operable by said gearing for rotating said element in cycles, controlling means for the gearing comprising a helix and an armature, and motor-actuated means for positively shifting the armature when it is inoperative by the helix.

2. In motor-operated mechanism, the combination of a shifting element, an electric-motor, motor-operated gearing, intermittent mechanism for rotating said element in cycles, controlling means for the gearing comprising a helix and an armature, motor-actuated means for positively shifting the armature if it is inoperative by the helix, and automatic switch-means for controlling the motor and the helix.

3. In motor-operated mechanism, the combination of a shifting element, an electric motor, a shaft, a planetary pinion, a carrier for the planetary pinion on the shaft, provided with a stop-arm, a driving gear meshing with the planetary pinion, driven by the motor, a gear meshing with and driven by the planetary pinion, skip-stop gears driven by the last mentioned gear for operating the element in cycles, a lever to engage the arm and hold the carrier, a magnet comprising an armature, connected to the lever, and means on the lever adapted to be shifted by the carrier to shift the armature, if it is inoperable by the magnet.

4. In motor-operated mechanism, the combination of a shifting element, an electric motor, motor-operated gearing for intermittently operating said element in cycles, comprising a pinion and a gear, and automatic switch-means for controlling the motor comprising a member rotatable with the gear, and an element rotatable with the pinion, for shifting said member.

5. In motor-operated mechanism, the combination of a shifting element, an electric motor, motor-operated gearing for intermittently operating said element in cycles, comprising a pinion and a gear, and automatic switch-means for controlling the motor comprising a ring rotatable with said gear, and a kick-arm rotatable with the pinion.

6. In motor-operated mechanism, the combination of a shifting element, an electric motor, motor-operated gearing for intermittently operating said element in cycles, comprising a pinion and a gear, and automatic switch-means for controlling the motor comprising a ring having a lost-motion connection with the gear, and an arm rotatable with the pinion for shifting said ring.

Signed at Chicago, Illinois, this 17th day of October, 1928.

JOSEPH FREUD.
CHARLES H. KOEHLER.